(12) United States Patent
Chen

(10) Patent No.: US 7,649,402 B1
(45) Date of Patent: Jan. 19, 2010

(54) FEEDBACK-CONTROLLED BODY-BIAS VOLTAGE SOURCE

(76) Inventor: Tien-Min Chen, 1049 Jacqueline Way, San Jose, CA (US) 95129

( * ) Notice: Subject to any disclaimer, the term of this patent is extended or adjusted under 35 U.S.C. 154(b) by 0 days.

(21) Appl. No.: 10/747,016

(22) Filed: Dec. 23, 2003

(51) Int. Cl.
*G05F 1/10* (2006.01)
(52) U.S. Cl. ...................... 327/536; 327/537
(58) Field of Classification Search ............... 327/534, 327/535, 536, 537; 363/59
See application file for complete search history.

(56) References Cited

U.S. PATENT DOCUMENTS

| | | | |
|---|---|---|---|
| 4,246,517 A * | 1/1981 | Dakroub | 315/307 |
| 4,769,784 A * | 9/1988 | Doluca et al. | 327/537 |
| 4,798,974 A | 1/1989 | Reczek et al. | |
| 4,912,347 A | 3/1990 | Morris | |
| 4,929,621 A | 5/1990 | Manoury et al. | |
| 5,039,877 A | 8/1991 | Chern | |
| 5,086,501 A | 2/1992 | DeLuca et al. | |
| 5,113,088 A | 5/1992 | Yamamoto et al. | |
| 5,124,632 A | 6/1992 | Greaves | |
| 5,167,024 A | 11/1992 | Smith et al. | |
| 5,201,059 A | 4/1993 | Nguyen | |
| 5,204,863 A | 4/1993 | Saint-Joigny et al. | |
| 5,218,704 A | 6/1993 | Watts, Jr. et al. | |
| 5,230,055 A | 7/1993 | Katz et al. | |
| 5,239,652 A | 8/1993 | Seibert et al. | |
| 5,254,883 A | 10/1993 | Horowitz et al. | |
| 5,336,986 A | 8/1994 | Allman | |
| 5,386,135 A | 1/1995 | Nakazato et al. | |
| 5,394,026 A | 2/1995 | Yu et al. | |
| 5,406,212 A | 4/1995 | Hashinaga et al. | |
| 5,422,591 A | 6/1995 | Rastegar et al. | |
| 5,422,806 A | 6/1995 | Chen et al. | |
| 5,440,520 A | 8/1995 | Schutz et al. | |
| 5,447,876 A | 9/1995 | Moyer et al. | |
| 5,461,266 A | 10/1995 | Koreeda et al. | |
| 5,483,434 A | 1/1996 | Seesink | |
| 5,495,184 A | 2/1996 | Des Rosiers et al. | |
| 5,502,838 A | 3/1996 | Kikinis | |

(Continued)

FOREIGN PATENT DOCUMENTS

EP   0381021   1/1989

(Continued)

OTHER PUBLICATIONS

CMOS Circuit Design, Layout and Simulation; R. Jacob Baker, Harry W. Li, David E. Boyce; IEEE Press; 1998.

(Continued)

*Primary Examiner*—Lincoln Donovan
*Assistant Examiner*—Thomas J Hiltunen

(57) ABSTRACT

A body-bias voltage source having an output monitor, charge pump, and shunt. A shunt circuit having on/off control is coupled to the output monitor and to the output of the charge pump. Upon sensing that the output voltage of the charge pump is above a desired value, the output monitor may disable the charge pump circuit and may enable the shunt circuit to reduce the voltage at the output of the charge pump. When the voltage output of the charge pump is below the desired value, the output monitor may disable the shunt circuit and may enable the charge pump circuit. A shunt circuit having proportional control may be substituted for the shunt circuit with on/off control.

15 Claims, 5 Drawing Sheets

U.S. PATENT DOCUMENTS

| | | | |
|---|---|---|---|
| 5,506,541 A | 4/1996 | Herndon | |
| 5,511,203 A | 4/1996 | Wisor et al. | |
| 5,519,309 A | 5/1996 | Smith | |
| 5,560,020 A | 9/1996 | Nakatani et al. | |
| 5,592,173 A | 1/1997 | Lau et al. | |
| 5,682,093 A | 10/1997 | Kivela | |
| 5,692,204 A | 11/1997 | Rawson et al. | |
| 5,717,319 A | 2/1998 | Jokinen | |
| 5,719,800 A | 2/1998 | Mittal et al. | |
| 5,727,208 A | 3/1998 | Brown | |
| 5,744,996 A | 4/1998 | Kotzle et al. | |
| 5,745,375 A | 4/1998 | Reinhardt et al. | |
| 5,752,011 A | 5/1998 | Thomas et al. | |
| 5,754,869 A | 5/1998 | Holzhammer et al. | |
| 5,757,171 A | 5/1998 | Babcock | |
| 5,778,237 A | 7/1998 | Yamamoto et al. | |
| 5,781,060 A | 7/1998 | Sugawara | |
| 5,812,860 A | 9/1998 | Horden et al. | |
| 5,815,724 A | 9/1998 | Mates | |
| 5,818,290 A * | 10/1998 | Tsukada | 327/537 |
| 5,825,674 A | 10/1998 | Jackson | |
| 5,838,189 A | 11/1998 | Jeon | |
| 5,842,860 A | 12/1998 | Funt | |
| 5,848,281 A | 12/1998 | Smalley et al. | |
| 5,884,049 A | 3/1999 | Atkinson | |
| 5,894,577 A | 4/1999 | MacDonald et al. | |
| 5,900,773 A | 5/1999 | Susak | |
| 5,920,226 A * | 7/1999 | Mimura | 327/537 |
| 5,923,545 A | 7/1999 | Nguyen | |
| 5,929,621 A | 7/1999 | Angelici et al. | |
| 5,933,649 A | 8/1999 | Lim et al. | |
| 5,940,020 A | 8/1999 | Ho | |
| 5,940,785 A | 8/1999 | Georgiou et al. | |
| 5,940,786 A | 8/1999 | Steeby | |
| 5,952,871 A | 9/1999 | Jeon | |
| 5,974,557 A | 10/1999 | Thomas et al. | |
| 5,986,947 A | 11/1999 | Choi et al. | |
| 5,996,083 A | 11/1999 | Gupta et al. | |
| 5,996,084 A | 11/1999 | Watts | |
| 5,999,040 A | 12/1999 | Do et al. | |
| 6,006,169 A | 12/1999 | Sandhu et al. | |
| 6,018,264 A | 1/2000 | Jin | |
| 6,021,500 A | 2/2000 | Wang et al. | |
| 6,035,407 A | 3/2000 | Gebara et al. | |
| 6,047,248 A | 4/2000 | Georgiou et al. | |
| 6,048,746 A | 4/2000 | Burr | |
| 6,078,084 A * | 6/2000 | Nakamura et al. | 257/369 |
| 6,078,319 A | 6/2000 | Bril et al. | |
| 6,087,820 A | 7/2000 | Houghton et al. | |
| 6,087,892 A | 7/2000 | Burr | |
| 6,091,283 A | 7/2000 | Murgula et al. | |
| 6,100,751 A | 8/2000 | De et al. | |
| 6,118,306 A | 9/2000 | Orton et al. | |
| 6,119,241 A | 9/2000 | Michail et al. | |
| 6,141,762 A | 10/2000 | Nicol et al. | |
| 6,157,092 A | 12/2000 | Hofmann | |
| 6,202,104 B1 | 3/2001 | Ober | |
| 6,216,235 B1 | 4/2001 | Thomas et al. | |
| 6,218,708 B1 | 4/2001 | Burr | |
| 6,226,335 B1 | 5/2001 | Prozorov | |
| 6,229,379 B1 | 5/2001 | Okamoto | |
| 6,232,830 B1 | 5/2001 | Fournel | |
| 6,272,642 B2 | 8/2001 | Pole, II et al. | |
| 6,279,048 B1 | 8/2001 | Fadavi-Ardekani et al. | |
| 6,281,716 B1 | 8/2001 | Mihara | |
| 6,303,444 B1 | 10/2001 | Burr | |
| 6,304,824 B1 | 10/2001 | Bausch et al. | |
| 6,311,287 B1 | 10/2001 | Dischler et al. | |
| 6,314,522 B1 | 11/2001 | Chu et al. | |
| 6,320,453 B1 | 11/2001 | Manning | |
| 6,337,593 B1 | 1/2002 | Mizuno et al. | |
| 6,345,362 B1 | 2/2002 | Bertin et al. | |
| 6,345,363 B1 | 2/2002 | Levy-Kendler | |
| 6,347,379 B1 | 2/2002 | Dai et al. | |
| 6,370,046 B1 | 4/2002 | Nebrigic et al. | |
| 6,373,323 B2 | 4/2002 | Kuroda | |
| 6,373,325 B1 * | 4/2002 | Kuriyama | 327/536 |
| 6,378,081 B1 | 4/2002 | Hammond | |
| 6,388,432 B2 | 5/2002 | Uchida | |
| 6,415,388 B1 | 7/2002 | Browning et al. | |
| 6,424,203 B1 | 7/2002 | Bayadroun | |
| 6,424,217 B1 | 7/2002 | Kwong | |
| 6,425,086 B1 | 7/2002 | Clark et al. | |
| 6,427,211 B2 | 7/2002 | Watts, Jr. | |
| 6,442,746 B1 | 8/2002 | James et al. | |
| 6,457,135 B1 | 9/2002 | Cooper | |
| 6,466,077 B1 | 10/2002 | Miyazaki et al. | |
| 6,469,573 B2 | 10/2002 | Kanda et al. | |
| 6,476,632 B1 | 11/2002 | La Rosa et al. | |
| 6,477,654 B1 | 11/2002 | Dean et al. | |
| 6,486,729 B2 * | 11/2002 | Imamiya | 327/536 |
| 6,487,668 B2 | 11/2002 | Thomas et al. | |
| 6,489,224 B1 | 12/2002 | Burr | |
| 6,496,027 B1 | 12/2002 | Sher et al. | |
| 6,496,057 B2 | 12/2002 | Wada et al. | |
| 6,510,400 B1 | 1/2003 | Moriyama | |
| 6,510,525 B1 | 1/2003 | Nookala et al. | |
| 6,513,124 B1 | 1/2003 | Furuichi et al. | |
| 6,518,828 B2 * | 2/2003 | Seo et al. | 327/534 |
| 6,519,706 B1 | 2/2003 | Ogoro | |
| 6,529,421 B1 | 3/2003 | Marr et al. | |
| 6,531,912 B2 * | 3/2003 | Katou | 327/536 |
| 6,563,371 B2 | 5/2003 | Buckley, III et al. | |
| 6,570,371 B1 | 5/2003 | Volk | |
| 6,574,577 B2 | 6/2003 | Stapleton et al. | |
| 6,574,739 B1 | 6/2003 | Kung et al. | |
| 6,600,346 B1 | 7/2003 | Macaluso | |
| 6,617,656 B2 | 9/2003 | Lee et al. | |
| 6,642,774 B1 | 11/2003 | Li | |
| 6,675,360 B1 | 1/2004 | Cantone et al. | |
| 6,677,643 B2 | 1/2004 | Iwamoto et al. | |
| 6,700,434 B2 | 3/2004 | Fujii et al. | |
| 6,731,221 B1 | 5/2004 | Dioshongh et al. | |
| 6,737,909 B2 | 5/2004 | Jaussi et al. | |
| 6,741,118 B2 | 5/2004 | Uchikoba et al. | |
| 6,774,705 B2 | 8/2004 | Miyazaki et al. | |
| 6,784,722 B2 | 8/2004 | Tang et al. | |
| 6,791,146 B2 | 9/2004 | Lai et al. | |
| 6,791,212 B2 | 9/2004 | Pulvirenti et al. | |
| 6,792,379 B2 | 9/2004 | Ando | |
| 6,803,633 B2 | 10/2004 | Mergens et al. | |
| 6,809,968 B2 * | 10/2004 | Marr et al. | 365/185.24 |
| 6,865,116 B2 * | 3/2005 | Kim et al. | 365/189.08 |
| 6,882,172 B1 | 4/2005 | Suzuki et al. | |
| 6,889,331 B2 | 5/2005 | Soerensen et al. | |
| 6,917,240 B2 | 7/2005 | Trafton et al. | |
| 6,922,783 B2 | 7/2005 | Knee et al. | |
| 6,927,620 B2 | 8/2005 | Senda | |
| 6,967,522 B2 | 11/2005 | Chandrakasan et al. | |
| 6,992,508 B2 | 1/2006 | Chow | |
| 6,906,582 B2 | 3/2006 | Chen et al. | |
| 7,012,461 B1 * | 3/2006 | Chen et al. | 327/535 |
| 7,030,681 B2 | 4/2006 | Yamazaki et al. | |
| 7,100,061 B2 | 8/2006 | Halepete et al. | |
| 7,119,604 B2 * | 10/2006 | Chih | 327/534 |
| 7,120,804 B2 | 10/2006 | Tschanz et al. | |
| 7,228,242 B2 | 6/2007 | Read et al. | |
| 2001/0028577 A1 | 10/2001 | Sung et al. | |
| 2002/0026597 A1 | 2/2002 | Dai et al. | |
| 2002/0073348 A1 | 6/2002 | Tani | |
| 2002/0083356 A1 | 6/2002 | Dai | |
| 2002/0087219 A1 | 7/2002 | Dai | |
| 2002/0087896 A1 | 7/2002 | Cline et al. | |
| 2002/0113628 A1 | 8/2002 | Ajit | |

| | | | |
|---|---|---|---|
| 2002/0116650 | A1 | 8/2002 | Halepete et al. |
| 2002/0130701 | A1* | 9/2002 | Kleveland ............ 327/536 |
| 2002/0138778 | A1 | 9/2002 | Cole et al. |
| 2002/0140494 | A1 | 10/2002 | Thomas et al. |
| 2002/0194509 | A1 | 12/2002 | Plante et al. |
| 2003/0036876 | A1 | 2/2003 | Fuller, III et al. |
| 2003/0065960 | A1 | 4/2003 | Rusu et al. |
| 2003/0071657 | A1 | 4/2003 | Soerensen et al. |
| 2003/0074591 | A1 | 4/2003 | McClendon et al. |
| 2003/0098736 | A1* | 5/2003 | Uchikoba et al. ....... 327/534 |
| 2003/0189465 | A1 | 10/2003 | Abadeer et al. |
| 2004/0025061 | A1 | 2/2004 | Lawrence |
| 2004/0073821 | A1 | 4/2004 | Naveh et al. |
| 2004/0103330 | A1 | 5/2004 | Bonnett |
| 2004/0108881 | A1 | 6/2004 | Bokui et al. |
| 2004/0246044 | A1 | 12/2004 | Myono et al. |
| 2005/0225376 | A1 | 10/2005 | Kin Law |
| 2007/0283176 | A1 | 12/2007 | Tobias et al. |

FOREIGN PATENT DOCUMENTS

| | | |
|---|---|---|
| EP | 0501655 | 2/1992 |
| EP | 0474963 | 3/1992 |
| EP | 0978781 | 4/2003 |
| EP | 1398639 | 3/2004 |
| JP | 63233480 | 9/1988 |
| JP | 04114365 | 4/1992 |
| JP | 9185589 | 7/1997 |
| JP | 409185589 | 7/1997 |
| JP | 11118845 | 4/1999 |
| JP | 2000172383 | 6/2000 |
| JP | 2001345693 | 12/2001 |
| JP | 2003324735 | 11/2003 |
| WO | 0127728 | 4/2001 |
| WO | 0238828 | 5/2002 |

OTHER PUBLICATIONS

Baker K. et al., "SHMOO Plotting: The Black Art of IC Testing", IEEE Design and Test of Computers, IEEE vol, 14, No. 3, Jul. 1, 1997, pp. 90-97, XP000793305 ISSN: 0740-7475 the whole document.

"Computer Software", Wikipedia, http://en.wikipedia.org/wiki/Software, retrieved May 2, 2007.

Desai et al., "Sizing of CLock Distribution Networks for High Performance CPU Chips", Digital Equipment Corporation, Hudson, MA, pp. 389-394, 1996.

"High Speed, Digitally Adjusted Stepdown Controllers for Notebook CPUS", Maxim Manual, pp. 11 & 21.

"Operation U (Refer to Functional Diagram)". LTC 1736, Linear Technology Manual, p. 9.

"Wafer Burn-In Isolation Circuit", IBM Technical Disclosure Bulletin, IBM Corp., New York, US, vol. 32, No. 6B, Nov. 1, 1989, pp. 442-443, XP00073858 ISSN: 0018-8689 the whole document.

Final Office Action Mailed Jan. 12, 2009; U.S. Appl. No. 10746539; TRAN-P212.

Non-Final Office Action Mailed Jun. 24, 2004; Patent No. 7228242; TRAN-P186.

Notice of Allowance Mailed Jan. 5, 2005; Patent No. 7228242; TRAN-P186.

Notice of Allowance Mailed Jul. 6, 2005; Patent No. 7228242; TRAN-P186.

Notice of Allowance Mailed Sep. 22, 2005; Patent No. 7228242; TRAN-P186.

Notice of Allowance Mailed Aug. 10, 2006; Patent No. 7228242; TRAN-P186.

Issue Notification Mailed May 16, 2007; Patent no. 7228242; TRAN-P186.

Non-Final Office Action Mailed Aug. 21, 2007; U.S. Appl. No. 10/951,835; TRAN-P186C1.

Restriction Requirement Mailed Mar. 19, 2007; U.S. Appl. No. 10/951,835; TRAN-P186C1.

Restriction Requirement Mailed may 28, 2009; U.S. Appl. No. 11/810,516; TRAN-P186C2.

Non-Final Office Action Mailed Dec. 23, 2004; Patent No. 7129771; TRAN-P199.

Final Office Action Mailed Apr. 13, 2005; Patent No. 7129771; TRAN-P199.

Non-Final Office Action Mailed Jul. 25, 2009; Patent No. 7129771; TRAN-P199.

Final Office Action Mailed Dec. 2, 2005; Patent No. 7129771; TRAN-P199.

Non-Final Office Action Mailed Apr. 18, 2006; Patent No. 7129771; TRAN-P199.

Notice of Allowance Mailed Jun. 21, 2006; Patent No. 7129771; TRAN-P199.

Non-Final Office Action Mailed Aug. 1, 2007; U.S. Appl. No. 11/591,431; TRAN-P199C1.

Notice of Allowance Mailed Nov. 23, 2007; U.S. Appl. No. 11/591,431; TRAN-P199C1.

Notice of Allowance Mailed Dec. 23, 2007; U.S. Appl. No. 11/591,431; TRAN-P199C1.

Issue Notification Mailed Apr. 2, 2008; U.S. Appl. No. 11/591,431; TRAN-P199C1.

Non-Final Office Action Mailed Sep. 26, 2008; U.S. Appl. No. 12/107,733; TRAN-P199C2.

Final Office Action Mailed Mar. 9, 2009; U.S. Appl. No. 12/107,733; TRAN-P199C2.

Non-Final Office Action Mailed May 21, 2009; U.S. Appl. No. 12/107,733; TRAN-P199C2.

Non-Final Office Action Mailed Sep. 6, 2006; U.S. Appl. No. 10/874,772; TRAN-P334.

Final Office Action Mailed Feb. 28, 2007; U.S. Appl. No. 10/874,772; TRAN-P334.

Non-Final Office Action Mailed Jun. 20, 2007; U.S. Appl. No. 10/874,772; TRAN-P334.

Notice of Allowance Mailed Nov. 20, 2007; U.S. Appl. No. 10/874,772; TRAN-P334.

Notice of Allowance Mailed Apr. 2, 2008; U.S. Appl. No. 10/874,772; TRAN-P334.

Non-Final Office Action Mailed Aug. 9, 2006; U.S. Appl. No. 10/874,407; TRAN-P333.

Notice of Allowance Mailed Oct. 1, 2008; U.S. Appl. No. 10/874,407; TRAN-P333.

Non-Final Office Action Mailed Feb. 3, 2009; U.S. Appl. No. 10/874,407; TRAN-P333.

Non-Final Office Action Mailed Dec. 10, 2004; U.S. Appl. No. 10/746,539; TRAN-P212.

Final Office Action Mailed Apr. 11, 2005; U.S. Appl. No. 10/746,539; TRAN-P212.

Non-Final Office Action Mailed Aug. 11, 2005; U.S. Appl. No. 10/746,539; TRAN-P212.

Final Office Action Mailed Dec. 19, 2005; U.S. Appl. No. 10/746,539; TRAN-P212.

Non-Final Office Action Mailed Apr. 11, 2006; U.S. Appl. No. 10/746,539; TRAN-P212.

Final Office Action Mailed Aug. 31, 2006; U.S. Appl. No. 10/746,539; TRAN-P212.

Non-Final Office Action Mailed Jan. 23, 2007; U.S. Appl. No. 10/746,539; TRAN-P212.

Final Office Action Mailed Jun. 15, 2007; U.S. Appl. No. 10/746,539; TRAN-P212.

Non-Final Office Action Mailed Nov. 30, 2007; U.S. Appl. No. 10/746,539; TRAN-P212.

Final Office Action Mailed Apr. 2, 2008; U.S. Appl. No. 10/746,539; TRAN-P212.

Non-Final Office Action Mailed Aug. 25, 2008; U.S. Appl. No. 10/746,539; TRAN-P212.

Final Office Action Mailed Jan.12, 2009; U.S. Appl. No. 10/746,539; TRAN-P212.

Non-Final Office Action Mailed Jun. 2, 2009; U.S. Appl. No. 10/746,539; TRAN-P212.

Non-Final Office Action Mailed Apr. 4, 2007; U.S. Appl. No. 11/358,482; TRAN-P213C1.

Final Office Action Mailed Aug. 23, 2007; U.S. Appl. No. 11/358,482; TRAN-P213C1.

Non-Final Office Action Mailed Sec. 26, 2007; U.S. Appl. No. 11/358,482; TRAN-P213C1.
Final Office Action Mailed May 23, 2008; U.S. Appl. No. 11/358,482; TRAN-P213C1.
Non-Final Office Action Mailed Oct. 14, 2008; U.S. Appl. No. 11/358,482; TRAN-P213C1.
Final Office Action Mailed Feb. 23, 2009; U.S. Appl. No. 11/358,482; TRAN-P213C1.
Non-Final Office Action Mailed Dec. 22, 2004; U.S. Appl. No. 10/747,022; TRAN-P213.
Notice of Allowance Mailed Sep. 28, 2005; U.S. Appl. No. 10/747,022; TRAN-P213.
Non-Final Office Action Mailed Jun. 13, 2005; U.S. Appl. No. 10/334,919; TRAN-P157.
Final Office Action Mailed Mar. 9, 2006; U.S. Appl. No. 10/334,919; TRAN-P157.
Non-Final Office Action Mailed Aug. 7, 2006; U.S. Appl. No. 10/334,919; TRAN-P157.
Final Office Action Mailed Feb. 21, 2007; U.S. Appl. No. 10/334,919; TRAN-P157.
Non-Final Office Action Mailed May 15, 2007; U.S. Appl. No. 10/334,919; TRAN-P157.
Non-Final Office Action Mailed Nov. 23, 2007; U.S. Appl. No. 10/334,919; TRAN-P157.
Non-Final Office Action Mailed Jan. 21, 2008; U.S. Appl. No. 10/334,919; TRAN-P157.
Non-Final Office Action Mailed Jan. 6, 2009; U.S. Appl. No. 10/334,919; TRAN-P157.
Non-Final Office Action Mailed May 28, 2009; U.S. Appl. No. 10/334,919; TRAN-P157.
Oner, H., et al.; A Compact Monitoring Circuit for Real-Time On-Chip Diagnosis of Hot-Carrier Induced Degradation; Microelectronic Test Structures, 1997, ICMTS 1997, Proceedings, IEEE International Conference on Monterey, CA, Mar. 17, 1997 - Mar. 20, 1997, p. 72-76.
Notice of Allowance Dated Jul. 13, 2009; U.S. Appl. No. 10/874,407.
Non Final Office Action Dated Jul. 23, 2009; U.S. Appl. No. 11/358,482.

\* cited by examiner

FEEDBACK-CONTROLLED BODY-BIAS VOLTAGE SOURCE

RELATED UNITED STATES PATENT APPLICATIONS

This application is related to U.S. patent application Ser. No. 10/747,015, now U.S. Pat. No. 7,129,771, by Tien-Min Chen, filed on Dec. 23, 2003, entitled "Servo Loop for Well Bias Voltage Source", and assigned to the assignee of the present invention.

This application is related to U.S. patent application Ser. No. 10/746,539 by Tien-Min Chen and Robert Fu, filed on Dec. 23, 2003, entitled "A Precise Control Component for a Substrate Potential Regulation Circuit", and assigned to the assignee of the present invention.

This application is related to U.S. patent application Ser. No. 10/747,022, now U.S. Pat. No. 7,012,461, by Tien-Min Chen, filed on Dec. 23, 2003, entitled "A Charge Stabilizing Component for a Substrate Potential Regulation Circuit", and assigned to the assignee of the present invention.

FIELD OF THE INVENTION

Embodiments of the present invention relate to circuits for providing operational voltages in complementary metal-oxide semiconductor (CMOS) circuits. In particular, embodiments of the present invention relate to circuits for providing a body-bias voltage for CMOS transistors.

BACKGROUND ART

As the operating voltages for CMOS transistor circuits have decreased, variations in the threshold voltages for the transistors have become more significant. Although low operating voltages offer the potential for reduced power consumption, threshold voltage variations due to process and environmental variables often prevent optimum efficiency and performance from being achieved due to increased leakage currents.

Prior Art FIG. 1A shows a conventional CMOS inverter 100. A P-type substrate 105 supports an NFET 110 and a PFET 120. The NFET 110 comprises a gate 112, source 113, and drain 114. The PFET 120 resides in an n-well 115, and comprises a gate 122, drain 123, and a source 124. The substrate 105 and source 113 are coupled by a tie 130 that is connected to ground (GND), while source 124 and N-well 115 are coupled by a tie 135 that is connected to a supply voltage ($V_{DD}$). The input to the inverter is applied to the gates 112 and 122, with the output taken from the drain contact 125. In this conventional configuration, the transistors are often treated as three terminal devices.

Threshold voltage variations may be compensated for by body-biasing. Body-biasing introduces a reverse bias potential between the bulk and the source of the transistor that allows the threshold voltage of the transistor to be adjusted electrically. The purpose of body-biasing is to compensate for 1) process variations; 2) temperature variations; 3) supply voltage variations; 4) changes in frequency of operation; and 5) changing levels of switching activity.

Prior Art FIG. 1B shows an inverter having connections for body-biasing. Body-bias can provided to the PFET 120 through a direct bias contact 150a, or by a buried n-well 140 using contact 150b. Similarly, body-bias may be provided to the NFET 110 by a surface contact 155a, or by a backside contact 155b. An aperture 145 may be provided in the buried n-well 125 so that the bias potential reaches the NFET 110. In general, a PFET 120 or an NFET 110 may be biased by one of the alternative contacts shown.

Depending upon the environmental and operational conditions, a CMOS circuit may require different levels of bias for the transistors. For example, a microprocessor that is executing a computationally intensive routine for a real-time application will typically be biased for maximum speed, whereas during periods of low activity the bias will be adjusted to minimize leakage current.

For a CMOS integrated circuit, the load presented to a circuit providing a body-bias voltage and the bias circuit itself may vary with the environmental and operational conditions of integrated circuit. Thus, the variations in the required body-bias voltage and the load to which it is applied should be taken into account to achieve optimum performance.

SUMMARY OF INVENTION

Thus, a need exists for a system for providing a body-bias voltage for CMOS transistors that is capable of adapting to varying output voltage requirements and load conditions.

Accordingly, embodiments of the present invention provide a system that uses feedback controlled charge pump to establishing a desired output voltage. The system accepts an input reference voltage that is related to the desired output voltage in order to provide the desired output voltage.

In an embodiment of the present invention, a charge pump having a voltage output and an enable input for on/off control is coupled to an output monitor (e.g., a sense amplifier). The output monitor is coupled to the output of the charge pump and to the enable input of the charge pump. A shunt circuit having on/off control is coupled to the output monitor and to the output of the charge pump. Upon sensing that the output voltage of the charge pump is above a desired value, the output monitor may disable the charge pump circuit and may enable the shunt circuit to reduce the voltage at the output of the charge pump. When the voltage output of the charge pump is below the desired value, the output monitor may disable the shunt circuit and may enable the charge pump circuit.

In another embodiment similar to that described above, a shunt circuit having proportional control is substituted for the shunt circuit with on/off control. Upon sensing a deviation from a desired output value at the output of the charge pump, the output monitor provides a signal to the shunt circuit that is proportional to the deviation at the charge pump output. The effective resistance of the shunt is proportionally reduced in response to a positive deviation and proportionally increased in response to a negative deviation. Proportional control of the shunt circuit may be combined with on/off control of the charge pump circuit to regulate the output voltage.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

Prior Art

DESCRIPTION OF THE PREFERRED EMBODIMENTS

In the following detailed description of the present invention, a feedback-controlled body-bias circuit, numerous specific details are set forth in order to provide a thorough understanding of the present invention. However, it will be obvious to one skilled in the art that the present invention may be practiced without these specific details. In other instances well known methods, procedures, components, and circuit elements have not been described in detail as not to unnecessarily obscure aspects of the present invention.

Figure 1A:
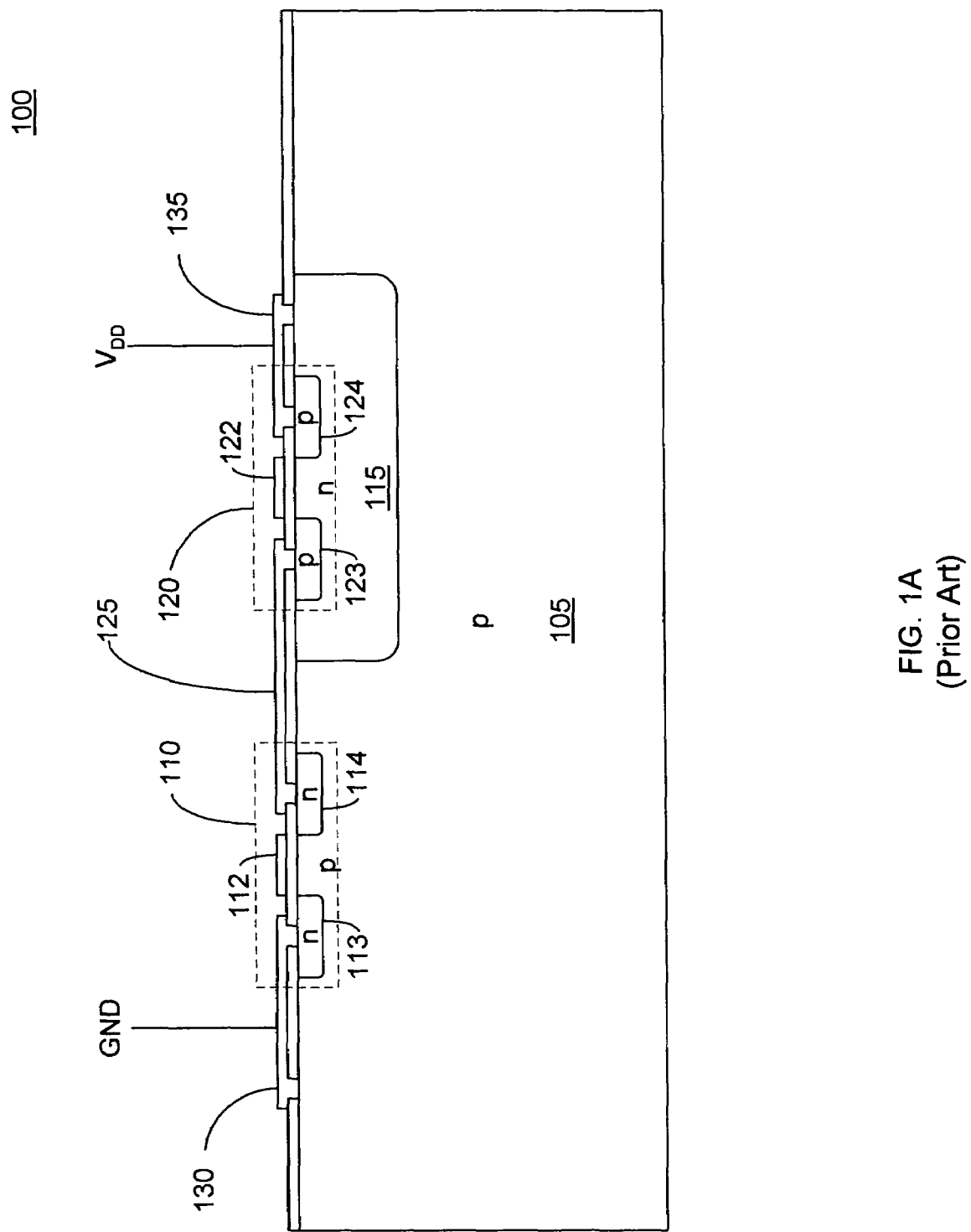
FIG. 1A shows a conventional CMOS inverter without body-bias connections.
Figure 1B:
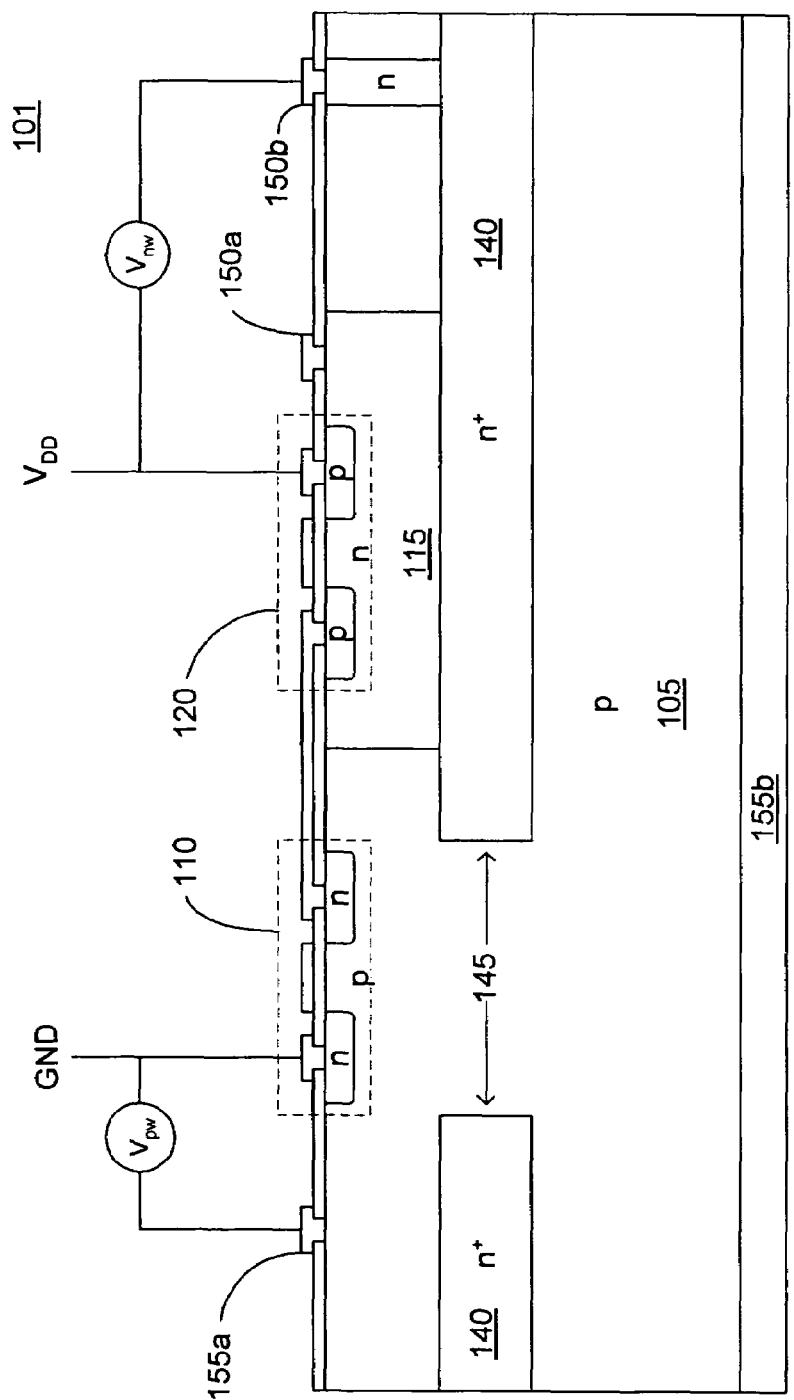
FIG. 1B shows a conventional CMOS inverter with body-bias connections.
Figure 2:
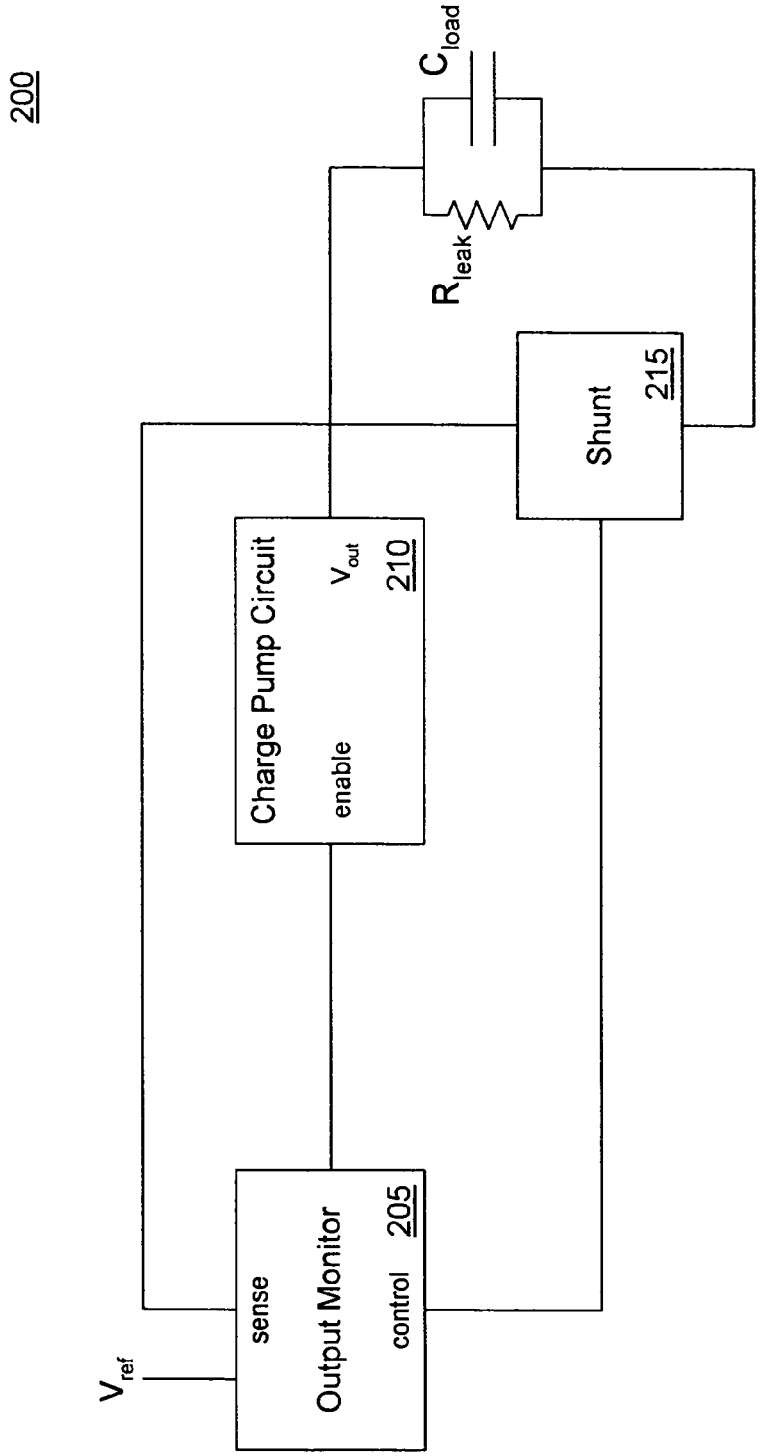
FIG. 2 shows a block diagram of a feedback controlled body-bias circuit in accordance with an embodiment of the present claimed invention.

FIG. 2 shows a block diagram 200 of an embodiment of the present invention. A charge pump 210 has an output coupled to $C_{load}$ that represents a substrate or well. Since body-bias is typically applied as a reverse bias to a p-n junction within a CMOS device, the load seen by the body-bias voltage source is generally a capacitive load; however, there is a certain amount of leakage current, represented by $R_{leak}$.

An output monitor 205 has a sense input coupled to the output of the charge pump 210. The output of the charge pump is compared to a reference voltage $V_{ref}$ by the output monitor 205. upon sensing a positive or negative deviation (overvoltage or undervoltage) that exceeds an allowed value, the output monitor provides a control signal to the charge pump circuit 210 and/or a shunt circuit 215.

For an overvoltage condition with loads having a large $C_{load}$ and large $R_{leak}$ (small leakage current), simply turning off the charge pump may not result in a sufficiently fast discharge of $C_{load}$ to the desired value. Accordingly, the shunt 215 may be enabled to provide a discharge path that allows faster correction of the output voltage $V_{out}$.

Upon sensing an undervoltage condition, the output monitor 205 may enable the charge pump circuit 210 and/or disable the shunt circuit 215. In one embodiment, the charge pump is run continuously, with the shunt being cycled between enabled and disabled states to maintain the output voltage.

In determining the voltage deviation that is permitted in the system, a deadband having upper and lower control points may be used, or a single setpoint may be used (no allowable deviation).

In an alternative embodiment, the output monitor 205 provides a proportional signal to the shunt circuit 215 that is proportional instead of the on/off control described above. The effective resistance of the shunt is proportionally reduced in response to a positive deviation and proportionally increased in response to a negative deviation. Proportional control is preferably implemented using analog circuits, and thus is suitable for use in a mixed-signal integrated circuit.

Figure 3:
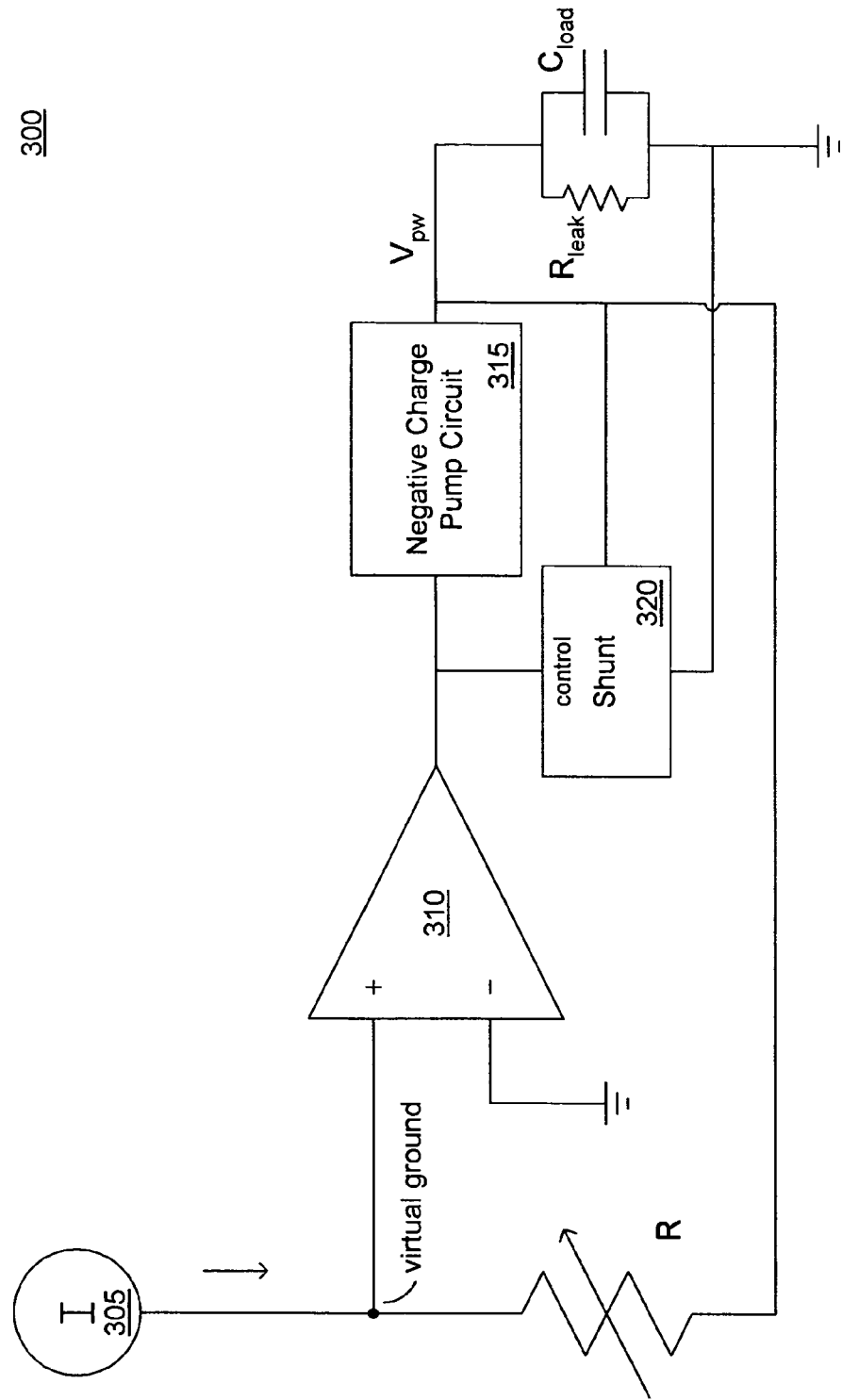
FIG. 3 shows a circuit diagram of a body-bias supply with a servo loop for NFETs in accordance with an embodiment of the present claimed invention.

FIG. 3 shows a circuit diagram 300 of a body-bias supply with a servo loop for NFETs in accordance with an embodiment of the present claimed invention. The current source 305 and variable resistor R combine to provide a reference voltage (e.g., $V_{ref}$ of FIG. 2). The comparator 310, shunt 320, and charge pump 315 correspond to the output monitor 205, shunt 215, and charge pump 210 of FIG. 2. The output of charge pump 315 is a negative voltage that may be used to bias a P-type substrate or well to provide a body-bias for NFETs.

Figure 4:
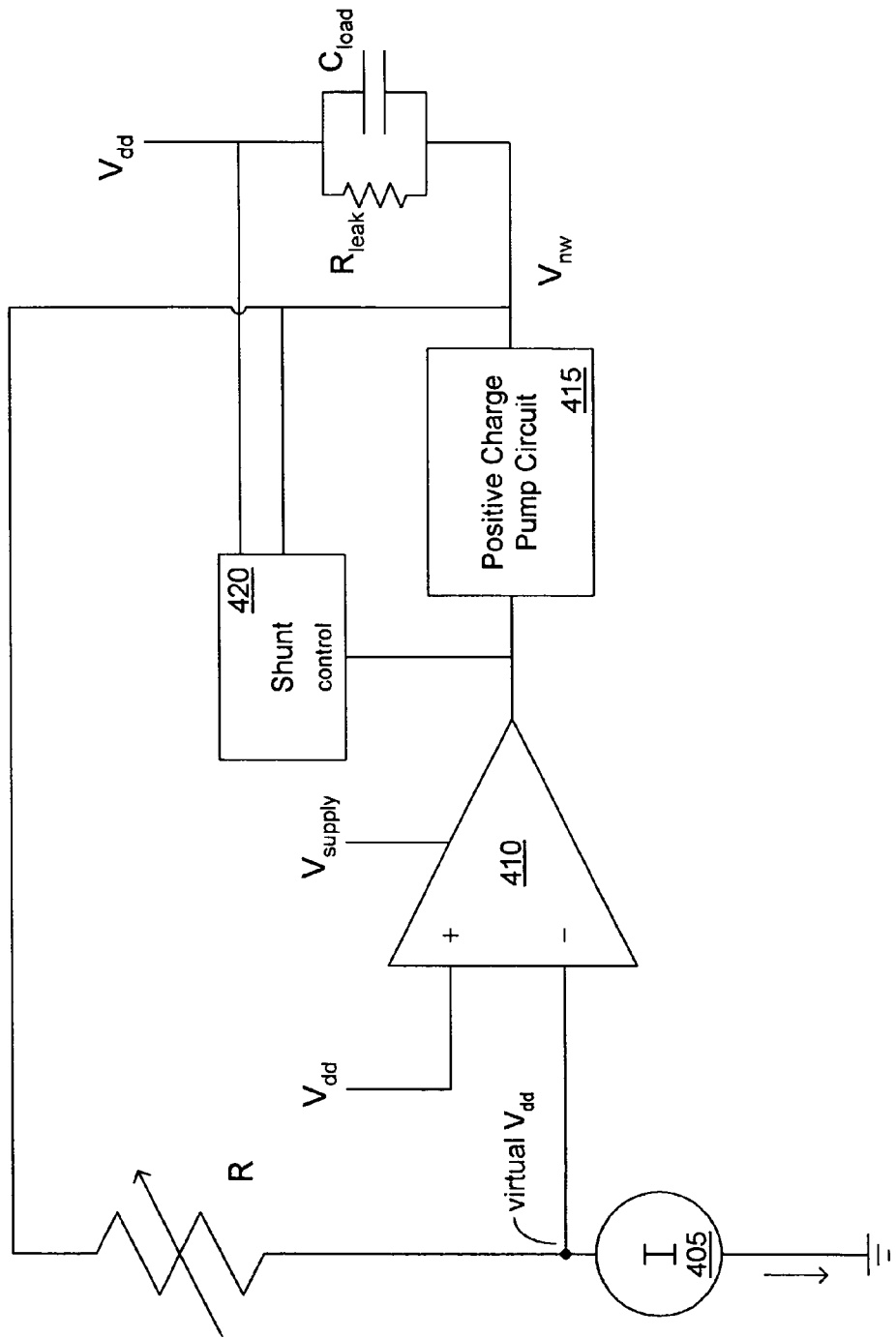
FIG. 4 shows a circuit diagram of a body-bias supply with a servo loop for PFETs in accordance with an embodiment of the present claimed invention.

FIG. 4 shows a circuit diagram 400 of a body-bias supply with a servo loop for PFETs in accordance with an embodiment of the present claimed invention. The current sink 405 and variable resistor R combine to provide a reference voltage (e.g., $V_{ref}$ of FIG. 2). The comparator 410, shunt 420, and charge pump 415 correspond to the output monitor 205, shunt 215, and charge pump 210 of FIG. 2. The output of charge pump 315 is a positive voltage that may be used to bias an N-type substrate or well to provide a body-bias for PFETs.

A description of the circuits shown in FIG. 3 and FIG. 4 is provided in the previously incorporated copending patent application entitled "Servo Loop for Well Bias Voltage Source." More specifically, descriptions of the variable resistor R and shunt (320, 420) shown in FIG. 3 and FIG. 4 are provided in the previously incorporated copending patent applications entitled "A Precise Control Component for a Substrate Potential Regulation Circuit "and" A Charge Stabilizing Component for a Substrate Potential Regulation Circuit."

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. For example, an integrated circuit having a P-type substrate and an N-well disposed therein is described. More generally, the invention may be used with a semiconductor substrate of either N-type or P-type having a complementary well disposed therein. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the Claims appended hereto and their equivalents.

The invention claimed is:

1. A feedback-controlled body-bias voltage source for an integrated circuit comprising:
   an output monitor comprising an input for a reference voltage and a sense input for sensing an output voltage, said output monitor for comparing said reference voltage to said output voltage and operable for generating a proportional signal for correcting said output voltage based on said comparing;
   a charge pump for generating said output voltage and comprising an enable input coupled to a control output of said output monitor, and a voltage output coupled to said sense input of said output monitor; and
   a shunt circuit for correcting said output voltage of said voltage output, said shunt circuit coupled to said voltage output and to said control output of said output monitor, wherein said shunt circuit is configured to be controlled according to said proportional signal of said output monitor, wherein an effective resistance of said shunt circuit is changed in proportion to said proportional signal;
   wherein said output monitor is operable to compare said reference voltage to said output voltage while said shunt circuit is activated, wherein said proportional signal has a state between an on state and an off state, wherein said state between said on and off states is proportional to a difference between said output voltage and said reference voltage.

2. The body-bias voltage source of claim 1, wherein said charge pump is configured to be run continuously.

3. The body-bias voltage source of claim 1, further comprising a P-type well coupled to said charge pump.

4. The body-bias voltage source of claim 1, further comprising an N-type well coupled to said charge pump.

5. The body-bias voltage source of claim 1, wherein for an overvoltage condition, said shunt circuit is enabled to provide a discharge path; and wherein for an undervoltage condition, said shunt circuit is cycled between enabled and disabled if said charge pump is running.

6. An integrated circuit comprising:

a substrate;

a complementary well disposed in said substrate;

a charge pump disposed in said substrate and comprising an output coupled to said complementary well, said charge pump for generating an output voltage;

an output monitor disposed in said substrate and comprising an input for a reference voltage and coupled to said charge pump for sensing said output voltage, said output monitor for comparing said reference voltage to said output voltage; and a shunt circuit coupled to said charge pump and to said output monitor, wherein enabling said shunt circuit is controlled by said output monitor, wherein for an overvoltage condition, said shunt circuit is enabled to provide a discharge path, and wherein said shunt circuit is configured for proportional control instead of on/off control;

wherein said output monitor is operable to compare said reference voltage to said output voltage while said shunt circuit is activated, wherein said proportional control utilizes a signal that has a state between an on state and an off state, wherein said state between said on and off states is proportional to a difference between said output voltage and said reference voltage.

7. The integrated circuit of claim 6, wherein said substrate is a P-type substrate.

8. The integrated circuit of claim 6, wherein said substrate is an N-type substrate.

9. The integrated circuit of claim 6, wherein said integrated circuit is a mixed-signal integrated circuit.

10. The integrated circuit of claim 6, wherein for an undervoltage condition, said shunt circuit is cycled between enabled and disabled if said charge pump is running.

11. A body-bias voltage source for an integrated circuit comprising:

a charge pump for charging a capacitance associated with a p-n junction and for generating an output voltage;

a servo loop coupling an output of said charge pump to an input of said charge pump, said servo loop comprising a comparator for comparing a reference voltage to said output voltage and operable for generating a proportional signal for correcting said output voltage based on said comparing; and a shunt circuit coupled to said servo loop and to said charge pump for reducing a voltage across said capacitance, wherein said shunt circuit is configured to be controlled according to said proportional signal of said servo loop, wherein an effective resistance of said shunt circuit is changed in proportion to said proportional signal;

wherein said comparator is operable to compare said reference voltage to said output voltage while said shunt circuit is activated, wherein said proportional signal has a state between an on state and an off state, wherein said state between said on and off states is proportional to a difference between said output voltage and said reference voltage.

12. The body-bias voltage source of claim 11, wherein said servo loop comprises a comparator.

13. The body-bias voltage source of claim 11, wherein said capacitance is associated with an n-well.

14. The body-bias voltage source of claim 11, wherein said capacitance is associated with a p-well.

15. The body-bias voltage source of claim 11, wherein for an overvoltage condition, said shunt circuit is enabled to provide a discharge path; and wherein for an undervoltage condition, said shunt circuit is cycled between enabled and disabled if said charge pump is running.

* * * * *